United States Patent
Williams

(10) Patent No.: US 6,598,942 B1
(45) Date of Patent: Jul. 29, 2003

(54) DISPOSABLE MASK FOR A VEHICLE WHEEL

(76) Inventor: Curtis C. Williams, 640 W. 57th St., Los Angeles, CA (US) 90037

( * ) Notice: Subject to any disclaimer, the term of this patent is extended or adjusted under 35 U.S.C. 154(b) by 0 days.

(21) Appl. No.: 10/051,946

(22) Filed: Jan. 22, 2002

(51) Int. Cl.7 .................................................. B60B 7/00
(52) U.S. Cl. ................................ 301/37.11; 301/37.101
(58) Field of Search ........................... 301/37.11, 37.63, 301/37.104, 37.109, 37.101, 37.26, 37.102, 37.34

(56) References Cited

U.S. PATENT DOCUMENTS

| | | | | |
|---|---|---|---|---|
| 3,854,448 A | * | 12/1974 | Kromanaker | 118/505 |
| 4,344,654 A | * | 8/1982 | Apezynski | 24/450 |
| 4,784,440 A | * | 11/1988 | Fair | 118/505 |
| 4,792,191 A | * | 12/1988 | Farmer | 118/505 |
| 4,874,206 A | * | 10/1989 | Sampson | 118/505 |
| 5,039,172 A | * | 8/1991 | Krieger | 118/505 |
| 5,423,599 A | * | 6/1995 | Sherod et al. | 301/37.103 |
| 5,435,630 A | * | 7/1995 | Tucker | 301/37.103 |
| 5,524,972 A | * | 6/1996 | Cailor et al. | 118/505 |
| 5,659,989 A | * | 8/1997 | Hsiao et al. | 301/37.109 |
| 6,030,050 A | * | 2/2000 | Ichikawa et al. | 301/37.109 |
| 6,068,345 A | * | 5/2000 | Bressie | 118/505 |
| 6,179,387 B1 | * | 1/2001 | Nasset et al. | 118/504 |
| 6,309,027 B1 | * | 10/2001 | Smith | 301/37.109 |
| 6,412,878 B1 | * | 7/2002 | Bell et al. | 16/110.1 |
| 6,425,639 B1 | * | 7/2002 | Getzelman | 215/225 |

* cited by examiner

*Primary Examiner*—S. Joseph Morano
*Assistant Examiner*—Long Nguyen
(74) *Attorney, Agent, or Firm*—Erik M. Arnhem

(57) ABSTRACT

A vehicle wheel can be protected against surface damage during a tire cleaning operation by providing a mask over the outer surface of the wheel. The mask can include a circular disk formed out of paper or cardboard. Temporary attachment of the disk to the vehicle wheel can be accomplished by permanent magnets embedded in the disk or by an annular band of pressure sensitive adhesive on one face of the disk.

3 Claims, 3 Drawing Sheets

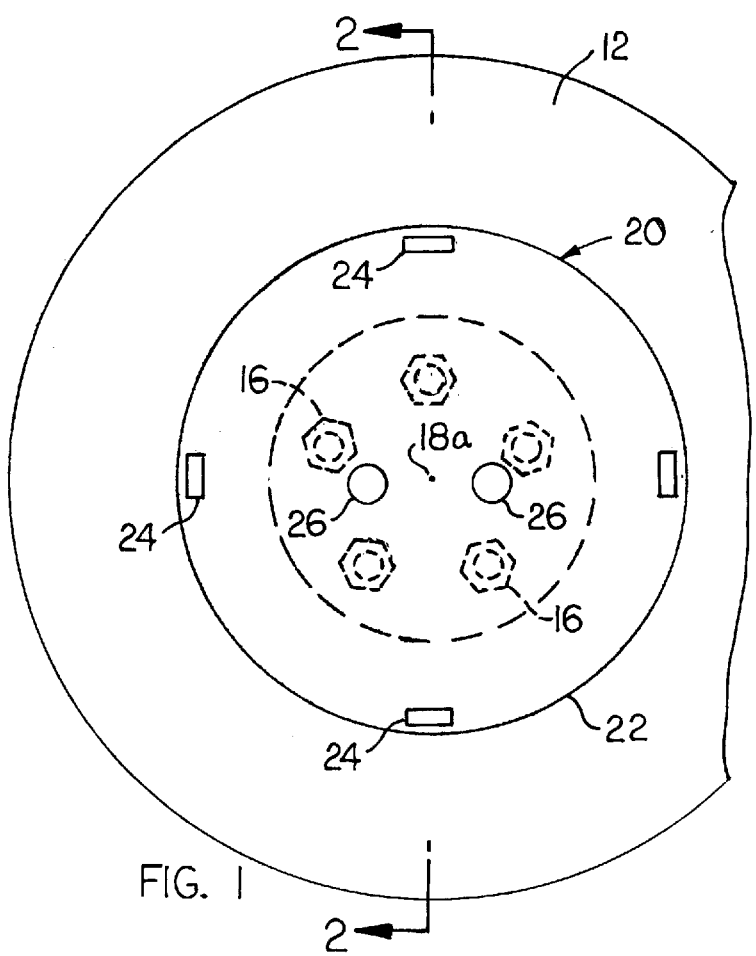
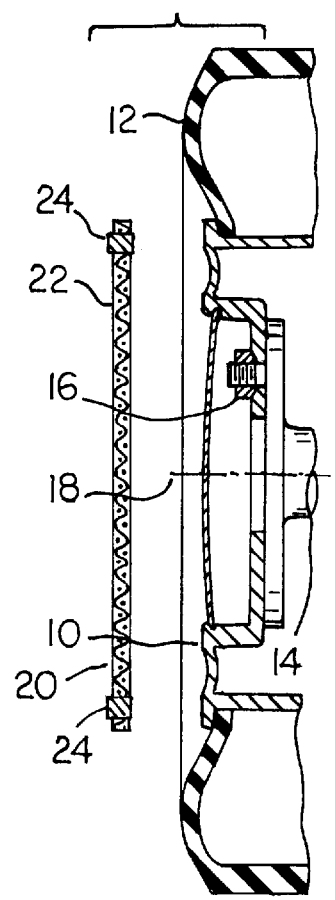
FIG. 1
FIG. 2

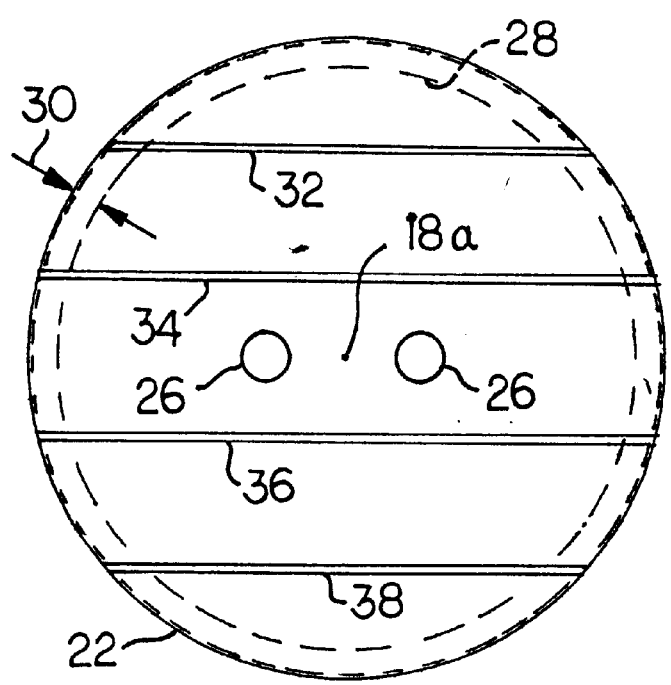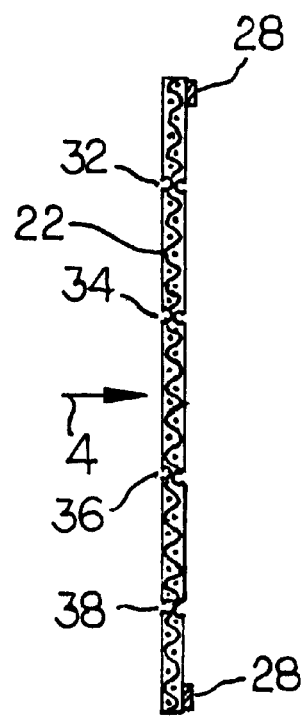
FIG. 4
FIG. 3

DISPOSABLE MASK FOR A VEHICLE WHEEL

FIELD OF THE INVENTION

The invention relates to a disposable mask for a vehicle wheel. The mask covers substantially the entire outer surface area of the wheel, so that when a person is cleaning the associated tire any tire-cleaning compound is prevented from contact with the wheel outer surface area.

BACKGROUND OF THE INVENTION

American Shield Systems of Salem, Oreg. markets a wheel shield that is designed to prevent tire cleaning compound from splattering onto a vehicle wheel during the process of cleaning the associated vehicle tire. The shield is apparently formed of ABS plastic material, to give the shield a relatively long service life.

Shield-A-Wheel of California advertises a wheel shield for the same purpose as the above-described wheel shield. The Shield-A-Wheel product is apparently a molded plastic disk structure having a stepped construction. The disk structure has a series of annular score lines graduated different radial distances from the disk center, whereby the user can cut along a selected score line to form a disk that fits a particular vehicle wheel diameter e.g. a thirteen inch, fourteen inch, fifteen inch, or sixteen inch wheel.

SUMMARY OF THE INVENTION

The present invention relates to a shield for a vehicle wheel, wherein the shield is formed of a relatively low cost material, such as paper or cardboard. The shield is preferably constructed as a flat disk devoid of flanges or special edges, whereby the disk can be economically formed by a simple blanking operation, using a low cost cutting die. The shield can be marketed as a low cost disposable mask that can be discarded after a single use, without requiring storage or preservation.

A principal aim of the invention is to provide a disposable mask (or shield) for a vehicle wheel, wherein the mask can be manufactured out of low cost materials, using low cost tooling.

Specific features of the invention will be apparent from the attached drawings and description of a preferred embodiment of the invention.

BRIEF DESCRIPTION OF THE DRAWINGS

FIG. 1 is a side view of a conventional vehicle wheel-tire assembly, together with a wheel mask of the present invention.

FIG. 2 is a transverse sectional view taken on line 2—2 in FIG. 1.

FIG. 3 is a view taken in the same direction as FIG. 2, but showing another mask constructed according to the invention.

FIG. 4 is an elevational view of FIG. 3 mask, taken in the direction of arrow 4 in FIG. 3.

DESCRIPTION OF A PREFERRED EMBODIMENT OF THE INVENTION

Figure 7:
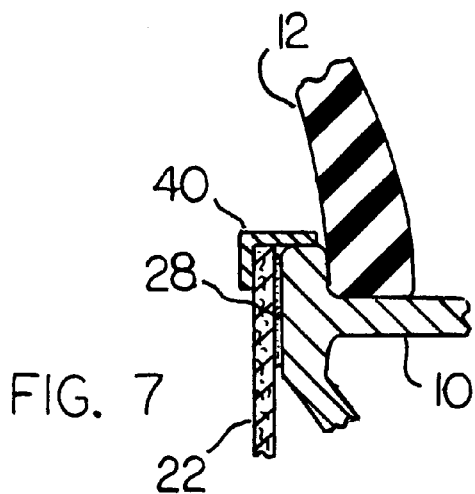
FIG. 7 is a fragmentary cross sectional view taken through a further form that the invention can take.

Referring to FIGS. 1 and 2, there is shown a conventional wheel-tire assembly for an automotive vehicle, e.g. a truck, sedan or van. The wheel-tire assembly comprises a circular metal wheel 10 and annular rubber tire 12 mounted on the rim edge of the wheel in conventional fashion. The wheel is attached to an axle 14 by means of nuts 16 spaced circumferentially around the wheel axis 18.

The present invention relates to a circular mask 20 that is designed for temporary placement on the outboard surface of wheel 10 while the tire surface is being cleaned. The mask protects the wheel surface from contact with any cleaning compound that might otherwise splash or migrate onto the wheel surface while a person is applying the cleaning compound to the tire surface.

Mask 20 includes a circular disk 22 formed of corrugated paper board, i.e, the material commonly used to form shipping boses. FIG. 2 shows the circular disk spaced from the vehicle wheel, i.e. a condition that occurs while the disk is being placed against the wheel.

The diameter of the circular disk 22 is the same as the diameter of wheel 10, so that when the disk is placed against the wheel, the outer force of the wheel is completely covered by the disk. In the arrangement depicted in FIGS. 1 and 2, the mask is temporarily held in a fixed position on wheel 10 by four permanent magnets 24 equidistantly spaced from disk axis 18a along the disk peripheral edge. The magnets act as clamps to temporarily affix disk 22 to the metal wheel.

Each magnet 24 can be mounted on disk 22 by applying an adhesive to the edges of the magnet, and inserting the magnet into a preformed mating hole in the disk. The magnets are located as close as possible to the peripheral edge of disk 22, to ensure that the magnets will have close surface engagement with the rim surface area of wheel 10.

To facilitate an accurate manipulation of disk 22 onto wheel 10 the disk has two circular holes 26 located equidistantly from disk axis 18a. The person can insert his thumb into one of the holes and his second finger into the other hole. The holes are preferably spaced about three inches apart, so as to serve as a low cost handle, whereby the person can move and adjust the disk to a centered position on wheel 10. Holes 26 are also useful when it is desired to pull the disk away from wheel 10 (e.g. for use on another wheel of the vehicle).

While the person is applying a cleaning compound to the vehicle tire it is not necessary that he control or manipulate disk 22. Magnets 24 provide sufficient force to retain disk 22 in a fixed position on the wheel. The corrugated paper board disk is relatively light, so that relatively small magnets can be used to temporarily affix the disk to wheel 10.

A feature of the invention is that disk 22 can be manufactured at relatively low cost. First, the disk material is relatively inexpensive. Second, the tooling required to blank out the disk and the various holes 26 etc. is inexpensive. The disk blank (including the various holes) can be formed in a single blanking operation, using low cost steel rule dies. Such dies commonly comprise a plywood panel having grooves that mount steel rule cutting blades following the outline of the part that is to be formed, e.g. a circular disk. The holes in the disk can be formed by piercing punches mounted on the plywood panel.

The mask depicted in FIGS. 1 and 2 can be manufactured at relatively low cost, so that the mask can be marketed as an economical disposable item capable of being discarded after only a few tire cleaning uses. The customer does not have to store the mask for extended periods of time.

The mask can be manufactured in a range of different sizes, to fit different wheel diameters, e.g. fourteen inch, fifteen inch, sixteen inch, or seventeen inch. Different tooling is required for each size mask. However, the inexpensiveness of the tooling enables the manufacturer to make a full range of mask sizes without undergoing an unreasonably high tooling expense.

FIGS. 3 and 4 show another form that the invention can take. In this case the circular disk is formed of corrugated paperboard, but without the magnetic attachment means. The corrugated paperboard disk 22 is temporarily affixed to a vehicle wheel (of the type shown in FIG. 2) by means of an annular band of pressure sensitive adhesive 28 applied to one face of the disk at the disk peripheral edge. The band of pressure sensitive adhesive preferably has a radial dimension 30 measuring approximately one quarter inch, whereby the adhesive is ensured of making contact with the rim area of the wheel. Disk 22 can be manipulated by means of two holes 26 located equidistantly from disk axis 18a.

In order to minimize the size of the shipping and display package, the disk can be folded around crease lines preformed in the disk surfaces. FIGS. 3 and 4 show disk 22 as having four creases 32,34,36 and 38 extending parallel to one another along chordal lines. These preformed creases enable the disk to be folded in spiral fashion into a tube-like configuration that takes up reduced space on the store shelf or in a shipping box. This feature is a cost-reduction feature for the shipper and/or store owner. When it is desired to use the mask on a vehicle wheel the mask is readily unfolded to the flat disk configuration depicted in FIGS. 3 and 4.

Figure 5:
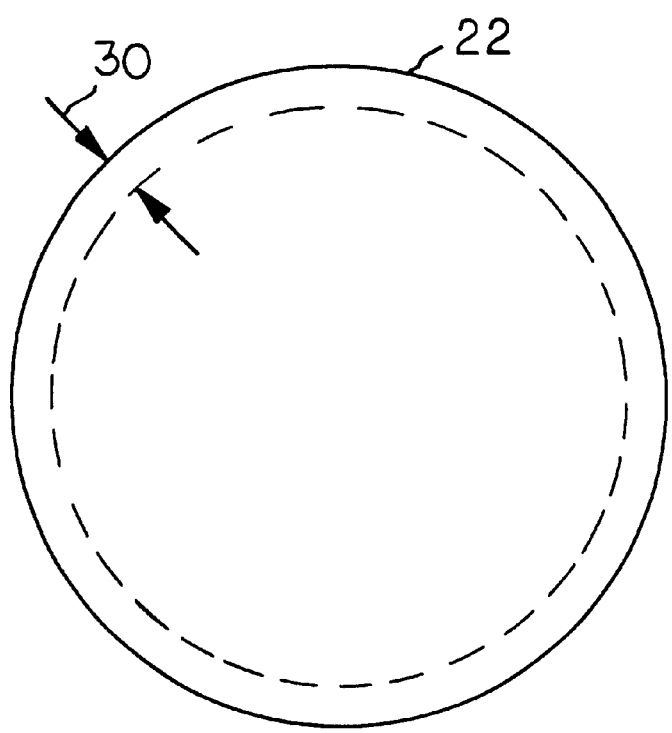
FIG. 5 is a sectional view taken in the same direction as FIG. 2, but showing a third mask embodying the invention.
Figure 6:
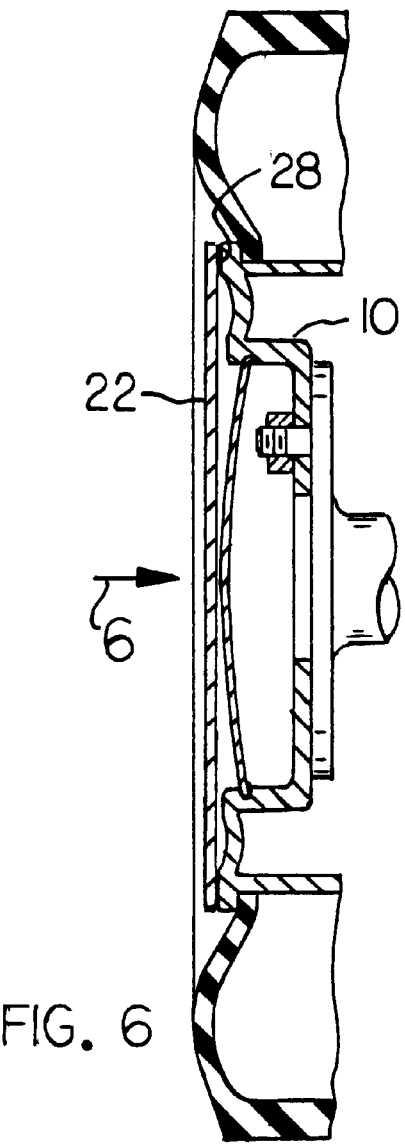
FIG. 6 is a side elevational view of the FIG. 5 mask, taken in the direction of arrow 6 in FIG. 5.

FIGS. 5 and 6 show another form of the invention, wherein the circular disk 22 is formed of single ply cardboard or heavy paper. One face of the cardboard (or paper) disk has an annular band of pressure sensitive adhesive 28 thereon, for temporarily affixing the disk to a vehicle wheel. The adhesive band has a radial thickness dimension 30 measuring about one fourth inch.

During shipment and storage of the mask, the adhesive bands 28, depicted in FIGS. 3 and 5, should be protected against contact with other structures or particulates. Therefore, an annular band of release paper can be applied to the adhesive at the point of manufacture. The release paper will be removed from the adhesive surface when it is desired to apply the disk (mask) to a vehicle wheel.

FIG. 7 fragmentarily shows a mask structure that is generally similar to the mask depicted in FIG. 5, except that a protective strip 40 is provided along the peripheral edge of the disk. The FIG. 7 mask comprises a circular disk 22 formed of cardboard. The disk has an annular adhesive band 28 thereon for temporary attachment of the disk to a vehicle wheel. Also, an L cross-sectioned strip 40 is adhesively attached to the flat left face of the disk, so that one leg of the L extends along and around the edge of the wheel 10 rim when the mask is applied to the vehicle wheel.

Strip 40 is preferably a thin wall flexible strip formed of a plastic or elastomeric material so that it can follow along the arcuate edge of disk 22. Strip 40 extends along the entire circumference of disk 22 so as to provide splash protection for the edge of the wheel.

The drawings depict various forms that the invention can take. An important feature in each case is that the mask (disk) is a flat disk formed out of a low cost material (paper or cardboard), using low cost tooling and blanking procedures.

A major aim of the invention is to provide a low cost mask structure that can be sold as a disposable item at a reasonable price.

What is claimed is:

1. A disposable mask for a vehicle wheel comprising:

A circular flat disk having a diameter that is the same as the wheel diameter;

said disk having an endless peripheral edge; and means extending along said peripheral edge for removably affixing said disk to a vehicle wheel;

said disk being formed of a material selected from the group consisting of paper and cardboard;

said affixing means consisting of an annular band of pressure-sensitive adhesive extending along the peripheral edge of said disk.

2. a disposable mask for a vehicle wheel comprising:

a circular flat disk having a diameter that is the same as the wheel diameter;

said disk having an endless peripheral edge; and means extending along said peripheral edge for removably affixing said disk to a vehicle wheel;

said disk being formed of a material selected from the group consisting of paper and cardboard;

said affixing means comprising plural permanent magnets spaced apart along the disk peripheral edge.

3. A disposable mask for a vehicle comprising;

A circular flat disk having a diameter that is the same as the wheel diameter;

said disk having an endless peripheral edge; and means extending along said peripheral edge for removably affixing said disk to a vehicle wheel;

said disk being formed of a material selected from the group consisting of paper and cardboard;

said affixing means consisting of an annular band of pressure-sensitive adhesive extending along the peripheral edge of said disk; said annular adhesive band having a radial thickness measuring approximately one quarter inch.

* * * * *